United States Patent [19]

Grabiec et al.

[11] Patent Number: 5,317,664
[45] Date of Patent: May 31, 1994

[54] FIBER OPTIC ASSEMBLY AND CRIMP SLEEVE USED WITH THE ASSEMBLY

[75] Inventors: Alan R. Grabiec, Lake Hiawatha; William G. Frey, Union, both of N.J.; Scott T. Davies, Germantown, Tenn.

[73] Assignee: Thomas & Betts Corporation, Memphis, Tenn.

[21] Appl. No.: 991,048

[22] Filed: Dec. 15, 1992

[51] Int. Cl.⁵ .............................................. G02B 6/26
[52] U.S. Cl. ...................................... 385/87; 385/86; 385/81; 385/84
[58] Field of Search ...................... 385/87, 84, 86, 81, 385/69, 66, 62, 77, 78

[56] References Cited

U.S. PATENT DOCUMENTS

| | | | |
|---|---|---|---|
| 2,468,169 | 4/1949 | Carlson et al. | 113/119 |
| 2,672,596 | 3/1954 | Grypma | 339/276 |
| 3,033,600 | 5/1962 | Drysdale | 287/114 |
| 3,184,535 | 5/1965 | Worthington | 174/90 |
| 3,842,497 | 10/1974 | Kehl et al. | 29/628 |
| 4,148,557 | 4/1979 | Garvey | 385/87 X |
| 4,440,469 | 4/1984 | Schumacher | 385/81 X |
| 4,447,121 | 5/1984 | Cooper et al. | 385/87 X |
| 4,693,550 | 9/1987 | Brown et al. | 385/81 X |
| 4,696,537 | 9/1987 | Bauer et al. | 385/81 X |
| 4,961,624 | 10/1990 | Savitsky et al. | 385/81 X |
| 5,013,122 | 5/1991 | Savitsky et al. | 385/81 X |
| 5,062,683 | 11/1991 | Grois et al. | 385/87 |
| 5,101,463 | 3/1992 | Cubukciyan et al. | 385/87 X |
| 5,140,661 | 8/1992 | Kerek | 385/62 X |
| 5,142,602 | 8/1992 | Cabato et al. | 385/87 |
| 5,202,942 | 4/1993 | Collins et al. | 385/87 |
| 5,222,169 | 6/1993 | Chang et al. | 385/87 |
| 5,224,187 | 6/1993 | Davidson | 385/87 |

FOREIGN PATENT DOCUMENTS 561859  6/1944  United Kingdom .......... 174/68.1 X

*Primary Examiner*—Brian Healy
*Attorney, Agent, or Firm*—Robert M. Rodrick

[57] ABSTRACT

A crimp sleeve, for connection of the back shell of a fiber optic cable connector with a fiber optic cable of a type including a buffered optic fiber having an encircling jacket inclusive of fibrous matter, includes a crimpable body member having first and second open ends and defining a passage between the first and second open ends, the crimpable member having first and second interior surfaces bounding the passage successively lengthwise of the body member. The first interior surface extends from the first open end interiorly of the body member and has a first radius relative to a central axis of the body member and the second interior surface has a second radius relative to the central axis of the body member of measure less than the first radius. The first interior surface is adapted, upon crimping of the body member onto the cable, to retentively engage exposed fibrous matter of the cable and the second interior surface is adapted, upon crimping of the body member onto the cable, to retentively engage the jacket of the cable adjacent the exposed fibrous matter.

9 Claims, 2 Drawing Sheets

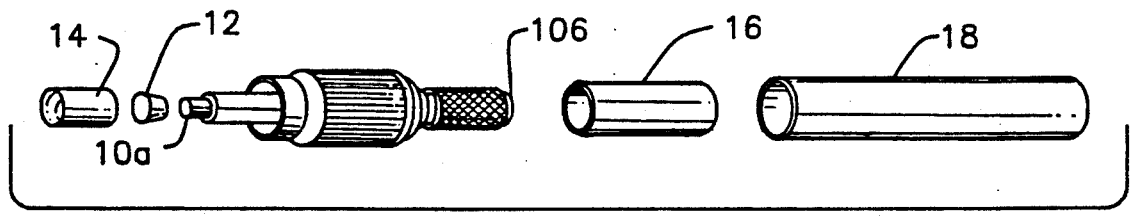
FIG. 1
(PRIOR ART)
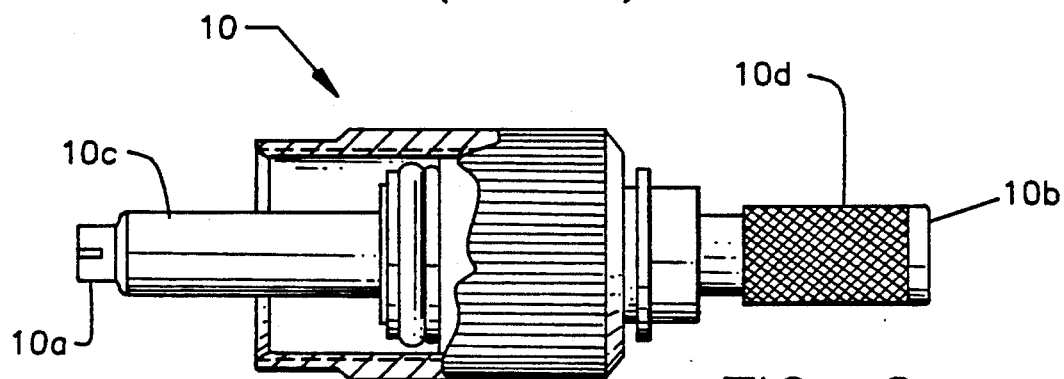
FIG. 2
(PRIOR ART)
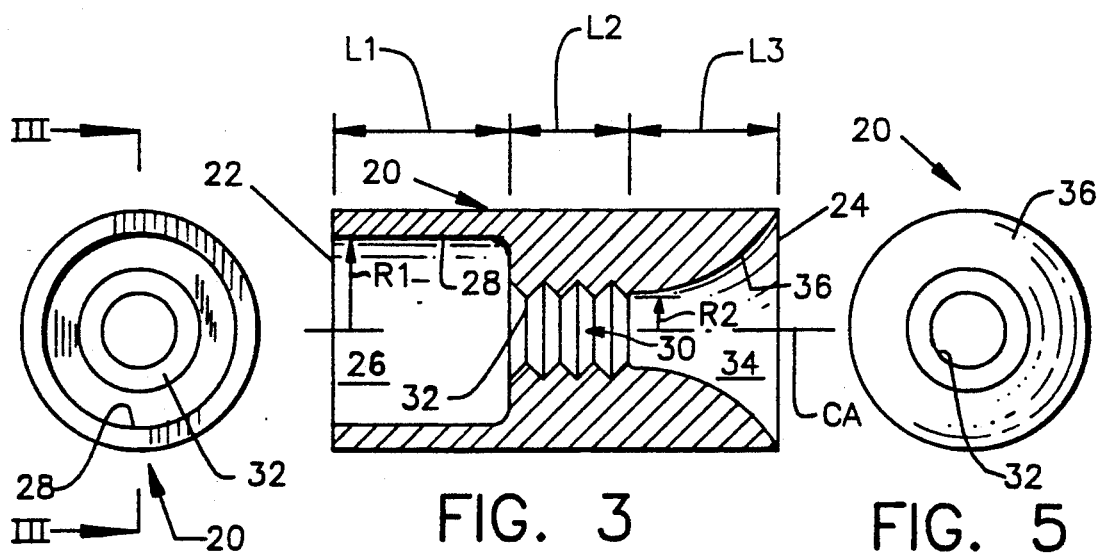
FIG. 3
FIG. 4
FIG. 5

FIBER OPTIC ASSEMBLY AND CRIMP SLEEVE USED WITH THE ASSEMBLY

FIELD OF THE INVENTION

This invention relates generally to fiber optics and pertains more particularly to improved fiber optic connectors and strain relief components thereof.

BACKGROUND OF THE INVENTION

Of the variety of fiber optic connectors in present commercial use is one manufactured and sold by the assignee hereof under the designation "SMA Fiber Optic Connector for Cabled Glass Fiber 905 Compatible". As is shown in FIG. 1, the components of this product, which is also known as a "fiber optic patch cord assembly", include a contact ferrule 10 having first and second end faces 10a and 10b at respective opposed ferrule ends, with a cable passage (not shown) extending through the ferrule and opening into end faces 10a and 10b. At end face 10a, a protective sleeve 12 is applied and a protective sleeve holder 14 is adapted to circumscribe sleeve 12. The further illustrated components include crimp sleeve 16 and protective heat-shrink tubing 18. As is seen in the partially-broken away depiction of ferrule 10 in FIG. 2, the ferrule has front shell 10c and back shell 10d.

In use of the apparatus of FIGS. 1 and 2, a fiber optic cable is prepared by first inserting an end thereof through heat-shrink tubing 18 and crimp sleeve 16, both of which have interior diameters exceeding the outer diameter of the fiber optic cable. Insertion of the cable, so assembled with the tubing and crimp sleeve, into the ferrule passage is prefaced by removing a length of the fiber outer jacket to expose a length of the fiber buffer tubing and then by removing a length of the exposed buffer tubing to expose a length of the optical fiber itself. The cable is inserted into the passage, following removal of protective sleeve holder 14, typically with rotation of the cable until the outer jacket bottoms against the ferrule and the fibrous matter collects on the knurled outer surface of back shell 10d. Crimp sleeve 16 is now advanced until the same circumscribes the bottomed and collected outer jacket of the cable. Sleeve 16 is now crimped upon the fibrous matter and the cable. Heat-shrink tubing 18, which will constitute a strain relief boot upon application of heat thereto, is now advanced over the crimped sleeve, following application of a suitable epoxy to the interior thereof and onto the cable jacket, and is heat-shrunk. The optical fiber is scribed as close as possible to end face 10a and gently pulled until it breaks and the fiber end face is suitably polished.

From applicants' perspective, while the described prior art product and practice have met commercial and technological needs in the fiber optic cable industry, the product is seen as not maximizing strain relief, particularly in that crimping force providing strain relief is limited to the expanse of the fiber jacket collected on the knurled ferrule surface. Further, the product and practice are seen as requiring excess components, particularly, the heat-shrink tubing and as being labor-intensive in requiring the heat application step.

SUMMARY OF THE INVENTION

The present invention has as its primary object the provision of fiber optic connectors of simplified structure and less labor-intensive in use.

A specific object of the invention is the provision of improved crimp sleeves for fiber optic connectors.

In attaining these and other objects, the invention provides, in one connector aspect thereof, a connector for a fiber optic cable of a type including a buffered optic fiber having an encircling jacket inclusive of fibrous matter, the connector including a back shell and a crimped body member having first and second open ends and defining a passage between the first and second open ends, the crimped member having first and second interior surfaces bounding the passage successively lengthwise of the body member, the first interior surface being in retentive engagement with exposed fibrous matter of the cable and in circumscribing relation to the back shell and the second interior surface being in retentive engagement with the jacket of the cable adjacent the exposed fibrous matter.

In a second connector aspect, the invention provides a connector for a fiber optic cable of a type including a buffered optic fiber having an encircling jacket inclusive of fibrous matter, the connector including a back shell and a crimped body member having first and second open ends and defining a passage between the first and second open ends, the crimped member having first, second and third interior surfaces bounding the passage successively lengthwise of the body member, the first interior surface extending from the first open end interiorly of the body member, the first interior surface being in retentive engagement with exposed fibrous matter of the cable and in circumscribing relation to the back shell, the second interior surface being in retentive engagement with the jacket of the cable adjacent said exposed fibrous matter and the third interior surface extending from the second open end interiorly of the body member and selectively engageable with the cable upon pulling of the cable transversely of the body member.

In a first crimp sleeve aspect, the invention provides a crimp sleeve for connection of the back shell of a fiber optic cable connector with a fiber optic cable of a type including a buffered optic fiber having an encircling jacket inclusive of fibrous matter, the crimp sleeve including a crimpable body member having first and second open ends and defining a passage between the first and second open ends, the crimpable member having first and second interior surfaces bounding the passage successively lengthwise of the body member, the first interior surface extending from the first open end interiorly of the body member and having a first radius relative to a central axis of the body member, the second interior surface having a second radius relative to the central axis of the body member of measure less than the first radius, the first interior surface being adapted, upon crimping of the body member onto the cable, to retentively engage exposed fibrous matter of the cable and to circumscribe the back shell, the second interior surface being adapted, upon crimping of the body member onto the cable, to retentively engage the jacket of the cable adjacent the exposed fibrous matter.

In a second crimp sleeve aspect, the invention provides a crimp sleeve for connection of the back shell of a fiber optic cable connector with a fiber optic cable of a type including a buffered optic fiber having an encircling jacket inclusive of fibrous matter, the crimp sleeve including a crimpable body member having first and second open ends and defining a passage between the first and second open ends, the crimpable member having first, second and third interior surfaces bounding the passage successively lengthwise of the body member, the first interior surface extending from the first open end interiorly of the body member and having a first radius relative to a central axis of the body member, the second interior surface having a second radius relative to the central axis of the body member of measure less than the first radius, the third interior surface extending from the second open end interiorly of the body member and having radii relative to the central axis of the body member progressively therealong of measure successively exceeding the second radius, the first interior surface being adapted, upon crimping of the body member onto the cable, to retentively engage exposed fibrous matter of the cable and to circumscribe the back shell, the second interior surface being adapted, upon crimping of the body member onto the cable, to retentively engage the jacket of the cable adjacent the exposed fibrous matter and the third interior surface being selectively engageable with the cable, following crimping of the body member onto the cable, upon pulling of the cable transversely of the body member.

The foregoing and other objects and features of the invention will be further understood from the following detailed description of a preferred embodiment thereof and from the drawings, wherein like reference numerals identify like components throughout.

DESCRIPTION OF THE DRAWINGS

FIG. 1 is an exploded view of a prior art fiber optic connector.

FIG. 2 is a partly-broken away view of the ferrule of the FIG. 1 prior art connector.

FIG. 3 is a sectional view, as would be seen from plane III—III of FIG. 4 of a crimpable body member in accordance with the invention.

FIG. 4 is a left side elevation of the FIG. 3 crimpable body member.

FIG. 5 is a right side elevation of the FIG. 3 crimpable body member.

DETAILED DESCRIPTION OF PREFERRED EMBODIMENTS AND PRACTICES

Figure 6:
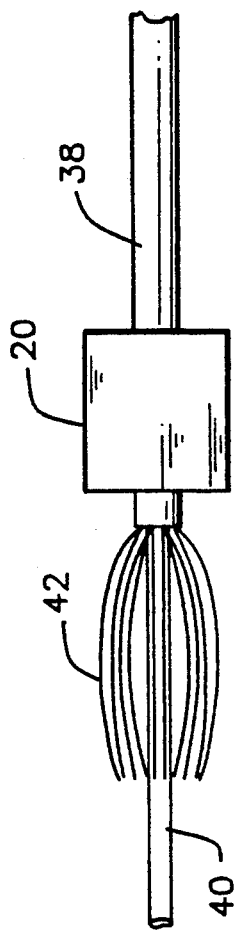
FIG. 6 is a schematic illustration of cable preparation in accordance with the invention.

Referring to FIGS. 3-5, a crimp sleeve in accordance with the invention is comprised of a crimpable body member 20 having first and second open ends 22 and 24. A passage extends through body member 20 into communication with open ends 22 and 24 and has at least two diverse characteristics. Thus, over body member length L1, passage part 26 is bounded by interior circular surface 28, which has a radius R1 with respect to body member central axis CA. Over body member length L2, passage part 30 is bounded by interior threaded surface 32, which has an interiormost radius R2, defined by the crests of the threading, of R2. As indicated in FIG. 3, radius R1 substantially exceeds that of radius R2.

Body member 20 preferably further defines a third passage part 34, extending over length L3, and having an interior bounding surface 36 extending to second open end 24 interiorly of the body member and having radii relative to central axis CA progressively therealong of measure successively exceeding radius R2 and ultimately reaching substantially the radius of body member 20 at end 24.

In preparation for use with body member 20, a fiber optic cable with body member 20 thereon has its jacket and buffer removed, as in the prior art practice, at its intended optical interface end. That portion of the cable to be ultimately resident interiorly of back shell 10d and in the passage part 26 extending over length L1, has the fibrous matter, typically Kelvar fibers, pulled outwardly of the cable to extend forwardly thereof. The cable jacketing adjacent the exposed fibrous matter is retained intact for ultimate residence in the passage part 30 extending over length L2. The cable, so prepared, is shown in part in the schematic showing of FIG. 6, wherein the jacketed fiber is indicated as 38, the buffered fiber as 40 and the exposed fibrous matter as 42.

The cable is now inserted into the passage of ferrule 10 and the exposed fibrous matter is dressed onto the knurled surface of back shell 10d. Body member 20 is now advanced into circumscribing relation with the exposed fibrous matter and the knurled surface of back shell 10d and crimped thereon.

Radius R1 of FIG. 3 is selected to accommodate passage of body member 20 onto the assembled fibrous matter and back shell 10d. Radius R2 of FIG. 3 is selected to accommodate passage of the body member onto the jacketed fiber. Radii of surface 36 are selected to maintain the surface free of engagement with the jacketed fiber distal from surface 32.

Figure 7:
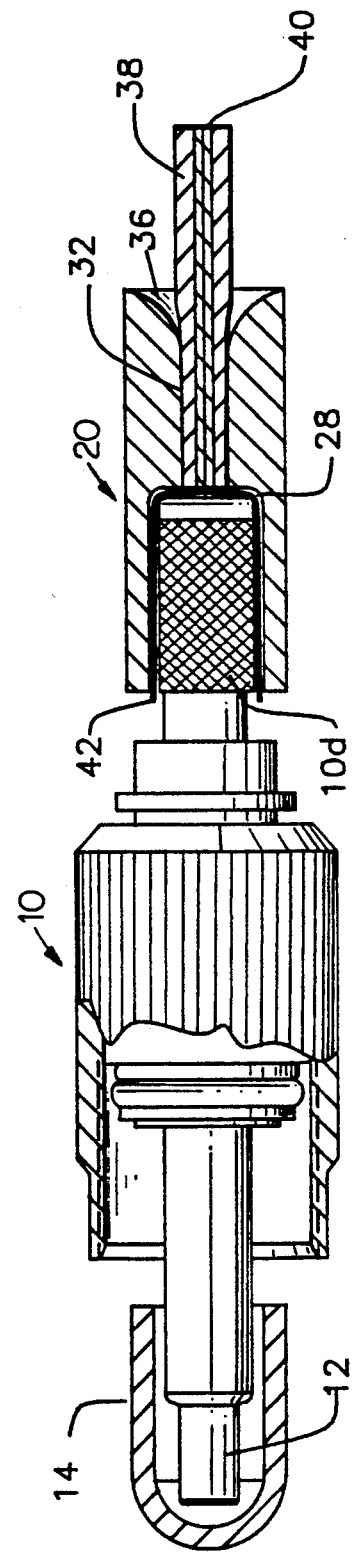
FIG. 7 is an elevation, partly in section and partly broken away, depicting the crimpable body member of the invention in crimped assembly with a fiber optic cable and parent fiber optic connector structure.
Figure 8:
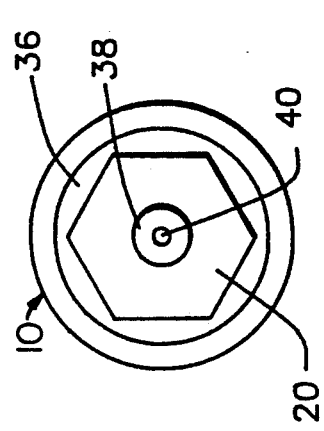
FIG. 8 is a right side elevation of FIG. 7.

Referring to FIGS. 6 and 7, body member 20 is shown in its crimped condition. Interior surface 28, as shown, is adapted, upon crimping of the body member onto the cable, to retentively engage the fibrous matter 42 of the cable cooperatively with back shell 10d, which the body member circumscribes. Interior surface 32, as also shown, is adapted, upon crimping of the body member onto the cable, itself to retentively engage the jacket of the cable.

The third interior surface is used in the preferred embodiment of the invention, which affords benefit beyond that provided by an embodiment using only the first and second interior surfaces. Thus, as is depicted in FIG. 7, surface 36 is normally unengaged with the cable, but is selectively engageable with the cable to lessen microbending loss upon pulling of the cable transversely of the crimpable member central axis.

Various changes in structure to the described connector assembly and crimpable body member (crimp sleeve) may evidently be introduced without departing from the invention. Thus, as will be appreciated, while the second interior surface desirably includes radially interiorly directed means f or enhancing retentive engagement of the jacket of the cable adjacent the exposed fibrous matter in the form of threading, other means may be employed or such means may be omitted. Likewise, while the connector back shell desirably includes radially outwardly directed means for enhancing retentive engagement of the exposed fibrous matter in the form of knurling, other means may be employed or such means may be omitted. Accordingly, it is to be understood that the particularly disclosed and depicted embodiments are intended in an illustrative and not in a limiting sense. The true spirit and scope of the invention are set forth in the following claims.

What is claimed is:

1. A connector for a fiber optic cable of a type including a buffered optic fiber having an encircling jacket inclusive of fibrous matter, the connector including a back shell and a crimp sleeve connecting said back shell and said fiber optic cable, the crimp sleeve including a crimpable body member having first and second open ends and defining a passage between the first and second open ends, the crimpable member having first, second and third interior surfaces bounding the passage successively lengthwise of the body member, the first interior surface extending from the first open end interiorly of the body member and having a first radius relative to a central axis of the body member, the second interior surface having a second radius relative to the central axis of the body member of measure less than the first radius, the third interior surface extending from the second open end interiorly of the body member and having radii relative to the central axis of the body member progressively therealong of measure successively exceeding the second radius, the first interior surface retentively engaging fibrous matter of the cable and circumscribing the back shell, the second interior surface retentively engaging the jacket of the cable adjacent the fibrous matter, the third interior surface being selectively engageable with the cable, upon pulling of the cable transversely of the body member.

2. The connector claimed in claim 1 wherein said second interior surface includes radially interiorly directed means for retentive engagement of said jacket of the cable adjacent said exposed fibrous matter.

3. The connector claimed in claim 1 wherein said back shell includes radially outwardly directed means for retentive engagement of said exposed fibrous matter.

4. The connector claimed in claim 3 wherein said second interior surface includes radially interiorly directed means for retentive engagement of said jacket of the cable adjacent said exposed fibrous matter.

5. The connector claimed in claim 2 wherein said radially interiorly directed means comprises threading on the second interior surface.

6. The connector claimed in claim 3 wherein said radially outwardly directed means for retentive engagement of said exposed fibrous matter comprises knurling on said back shell.

7. A crimp sleeve for connection of the back shell of a fiber optic cable connector with a fiber optic cable of a type including a buffered optic fiber having an encircling jacket inclusive of fibrous matter, the crimp sleeve including a crimpable body member having first and second open ends and defining a passage between the first and second open ends, the crimpable member having first, second and third interior surfaces bounding the passage successively lengthwise of the body member, the first interior surface extending from the first open end interiorly of the body member and having a first radius relative to a central axis of the body member, the second interior surface having a second radius relative to the central axis of the body member of measure less than the first radius, the third interior surface extending from the second open end interiorly of the body member and having radii relative to the central axis of the body member progressively therealong of measure successively exceeding the second radius, the first interior surface being adapted, upon crimping of the body member onto the cable, to retentively engage exposed fibrous matter of the cable and to circumscribe the back shell, the second interior surface being adapted, upon crimping of the body member onto the cable, to retentively engage the jacket of the cable adjacent the exposed fibrous matter, the third interior surface being selectively engageable with the cable, following crimping of the body member onto the cable, upon pulling of the cable transversely of the body member.

8. The crimp sleeve claimed in claim 7 wherein said second interior surface includes radially interiorly directed means for retentive engagement of said jacket of the cable adjacent said exposed fibrous matter.

9. The connector claimed in claim 8 wherein said radially interiorly directed means comprises threading on the second interior surface.

* * * * *